United States Patent
Regulin et al.

(10) Patent No.: US 11,691,215 B2
(45) Date of Patent: Jul. 4, 2023

(54) APPARATUS AND METHOD FOR ADDITIVE MANUFACTURING

(71) Applicants: PRECITEC GMBH & CO. KG, Gaggenau (DE); SIEMENS AKTIENGESELLSCHAFT, Munich (DE)

(72) Inventors: Daniel Regulin, Munich (DE); Heinz-Ingo Schneider, Baldham (DE); Henning Hanebuth, Pliening OT Gelting (DE); Markus Kogel-Hollacher, Haibach (DE); Thibault Bautze, Munich (DE); Christian Staudenmaier, Seltz (DE)

(73) Assignees: Siemens Aktiengesellschaft, Munich (DE); Precitec GmbH & Co. KG, Gaggenau (DE)

( * ) Notice: Subject to any disclaimer, the term of this patent is extended or adjusted under 35 U.S.C. 154(b) by 647 days.

(21) Appl. No.: 16/499,673

(22) PCT Filed: Apr. 3, 2018

(86) PCT No.: PCT/EP2018/058421
§ 371 (c)(1),
(2) Date: Sep. 30, 2019

(87) PCT Pub. No.: WO2018/178387
PCT Pub. Date: Oct. 4, 2018

(65) Prior Publication Data
US 2020/0038954 A1    Feb. 6, 2020

(30) Foreign Application Priority Data

Mar. 31, 2017 (DE) .......................... 102017106975.5
Feb. 19, 2018 (EP) .................................... 18157417
Feb. 20, 2018 (EP) .................................... 18157600

(51) Int. Cl.
B23K 26/03 (2006.01)
B23K 26/02 (2014.01)
(Continued)

(52) U.S. Cl.
CPC ............ B23K 26/032 (2013.01); B22F 10/25 (2021.01); B22F 10/30 (2021.01); B22F 12/53 (2021.01);
(Continued)

(58) Field of Classification Search
CPC ... B29C 64/153; B29C 64/386; B29C 64/393; B29C 64/135; B29C 64/209;
(Continued)

(56) References Cited

U.S. PATENT DOCUMENTS

2006/0215246 A1    9/2006    Kerekes et al.
2010/0155375 A1    6/2010    Dietz et al.
(Continued)

FOREIGN PATENT DOCUMENTS

CA     2307509 A1 * 11/2000 ......... G01N 15/0211
CN     102319959 A     1/2012
(Continued)

OTHER PUBLICATIONS

Neef, A., et al. "Low coherence interferometry in selective laser melting." Physics Procedia 56 (2014): 82-89.
(Continued)

*Primary Examiner* — Philip C Tucker
*Assistant Examiner* — Jimmy R Smith, Jr.
(74) *Attorney, Agent, or Firm* — Lempia Summerfield Katz LLC

(57) ABSTRACT

The invention relates to a device (100) for an additive manufacture. The device (100) comprises a laser device (110) for machining material using a laser beam (112), said laser device (110) being designed to deflect the laser beam
(Continued)

(112) onto a machining region of a workpiece (10); at least one supply device (130) for a supply material, said supply device being designed to supply the supply material to the machining region; and an interferometer (140) which is designed to measure a distance to the workpiece (10) by means of an optical measuring beam (142).

12 Claims, 13 Drawing Sheets

(51) Int. Cl.
  *B33Y 50/02* (2015.01)
  *B22F 10/25* (2021.01)
  *B22F 12/53* (2021.01)
  *B22F 12/90* (2021.01)
  *B22F 10/30* (2021.01)
  *B29C 64/209* (2017.01)
  *B23K 26/14* (2014.01)
(52) U.S. Cl.
  CPC .............. *B22F 12/90* (2021.01); *B23K 26/02* (2013.01); *B22F 2999/00* (2013.01); *B23K 26/034* (2013.01); *B23K 26/1476* (2013.01); *B29C 64/209* (2017.08); *B33Y 50/02* (2014.12)
(58) Field of Classification Search
  CPC ... B29C 64/264; B29C 64/343; B22F 3/1055; B22F 2003/1056; B22F 2003/1057; B22F 2003/1058; B22F 2003/1059; B22F 10/20; B22F 10/25; B22F 10/30; B22F 12/53; B22F 12/90; B22F 2202/11; B22F 2203/00; B22F 2999/00; B33Y 50/02; B33Y 10/00; B33Y 30/00; B33Y 50/00; Y02P 10/25; G01B 11/2441; B23K 26/032; B23K 26/034; B23K 26/0344; B23K 26/044; B23K 26/046; B23K 26/144; B23K 26/1462; B23K 26/147; B23K 26/1476; B23K 26/342; B23K 26/035; B23K 26/02
  See application file for complete search history.

(56) References Cited

U.S. PATENT DOCUMENTS

| | | | |
|---|---|---|---|
| 2013/0120740 A1* | 5/2013 | Schonleber | B23K 26/048 356/72 |
| 2013/0286073 A1 | 10/2013 | Blessing et al. | |
| 2015/0219444 A1* | 8/2015 | Bamberg | B22F 12/00 264/408 |
| 2016/0023403 A1 | 1/2016 | Ramos | |
| 2016/0059350 A1 | 3/2016 | Schoenleber | |
| 2017/0239719 A1* | 8/2017 | Buller | G05B 19/4099 |
| 2017/0266727 A1* | 9/2017 | Nishino | G01N 29/043 |
| 2018/0143147 A1 | 5/2018 | Milner | |

FOREIGN PATENT DOCUMENTS

| | | |
|---|---|---|
| CN | 101349551 B | 8/2012 |
| DE | 102008056695 A1 | 5/2010 |
| DE | 102010016862 A1 | 11/2011 |
| DE | 102014011569 A1 | 2/2016 |
| DE | 102014219656 A1 | 3/2016 |
| EP | 1977850 A1 | 10/2008 |
| EP | 1705616 B1 | 5/2012 |
| JP | 2014502931 A | 2/2014 |
| JP | 2016060063 A | 4/2016 |
| WO | WO2016183210 A1 | 11/2016 |

OTHER PUBLICATIONS

PCT International Search Report and Written Opinion of International Searching Authority dated Apr. 3, 2018. corresponding to PCT International Application No. PCT/EP2018/058421 filed May 23, 2018.
Japanese Notice of Allowance for Japanese Patent Application No. 2019-553311 dated Sep. 29, 2021, with English translation.
Chinese Office Action for Chinese Application No. 201880035836.1 dated May 7, 2021.

* cited by examiner

APPARATUS AND METHOD FOR ADDITIVE MANUFACTURING

The present disclosure relates to an apparatus and a method for additive manufacturing. In particular, the present disclosure relates to an apparatus and a method for laser metal deposition (LMD).

PRIOR ART

Laser metal deposition (LMD or cladding) uses a laser beam and a supply material to deposit material to a workpiece. The laser beam produces a melt pool on a surface of the workpiece. Metal powder or wire is introduced through a nozzle. Material regions welded to one another, which yield structures on existing workpieces or new structures, arise.

The manufacture of coatings and three-dimensional layer structures by means of laser metal deposition is known. In the meantime, even more complex three-dimensional components are being manufactured using laser metal deposition. Laser metal deposition requires a precise adjustment of a multiplicity of process parameters, with satisfactory manufacturing only being able to be implemented in a small range of process parameters around a work point. Accordingly, there currently is great interest in suitably adjusting the process parameters during laser metal deposition.

Measuring techniques, for example for examining the welded or deposited material region, the emissions from the interaction zone or the melt pool and the geometry thereof, can be used for process control and process monitoring. Known methods, such as, e.g., camera-based methods for melt pool geometry analysis or pyrometer-based methods for temperature measurement are based on secondary emissions from the interaction process and cannot provide any statement, or can provide only a very conditional statement, about an absolute geometry. However, the specification of the height and/or the complete geometry of the component produced additively or of the welding bead produced additively provides useful information for specifying the processing quality and/or for the process control.

By way of example, DE 10 2014 219 656 A1 has disclosed a method for producing and/or repairing components such as gas turbine components, for example rotor blades or guide vanes, in which subtractive and additive method steps are combined in a hybrid method. Process parameters such as contours, temperature, material and/or surface condition can be checked and controlled by online monitoring using the aforementioned pyrometer.

DISCLOSURE OF THE INVENTION

An object of the present disclosure lies in providing an apparatus and a method for additive manufacturing, which provide improved process control, more particularly closed-loop process control and/or open-loop process control. In particular, an object of the present invention lies in determining a topography of a welded material region at a workpiece or a generated structure. Further, another object of the invention lies in developing an improved method and an improved manufacturing device for laser metal deposition, wherein a reliable manufacture of three-dimensional components, in particular, is facilitated.

This object is achieved by the subject matter of the independent claims and the aspects of this invention. Advantageous configurations of the invention are specified in the dependent claims.

An apparatus for additive manufacturing is specified according to one aspect. The apparatus comprises a laser apparatus for material processing by means of a laser beam, such as, e.g., a laser processing head, wherein the laser apparatus is configured to direct the laser beam onto a processing region of a workpiece, at least one supply apparatus for a supply material, configured to supply the supply material to the processing region, and an interferometer unit configured to measure, by means of at least one optical measurement beam, a surface of the workpiece, for instance a distance to the workpiece, or a distance between the apparatus and the workpiece surface, and/or a topography of the workpiece surface.

A method for additive manufacturing is specified according to other embodiments. The method comprises directing a laser beam onto a processing region of a workpiece, supplying a supply material to the processing region, and measuring a surface of the workpiece, for instance measuring a distance to the workpiece and/or a topography of the workpiece surface, using an interferometer unit.

According to preferred embodiments, the at least one optical measurement beam can be provided in static fashion with respect to the laser beam. Alternatively, the at least one optical measurement beam can be provided in dynamic fashion, i.e., in movable fashion, with respect to the laser beam. Expressed differently, the optical measurement beam can carry out a predetermined scanning movement or pass over a scanning figure. The interferometer unit may comprise an interferometer for providing a reference beam and the optical measurement beam. Furthermore, the interferometer unit may comprise an evaluation unit for evaluating the data captured by the interferometer. In particular, the interferometer unit can comprise an interferometer that is configured to allow the optical measurement beam to carry out movements, such as linear or rotary movements in particular, either individually or in combination. Thus, the scanning movement performed by the measurement beam can be circular or linear, or else have the form of an 8. The linear scanning movement can be parallel to a processing direction or have an angle thereto. The optical measurement beam can be guided in the leading region and/or in the trailing region and/or through a melt pool. Two or more optical measurement beams can be moved in a manner dependent on one another or independently of one another. In one example, two or more measurement beams may carry out a rotating movement together, for example about the beam axis of the laser beam in the processing direction.

By way of example, use can be made of two optical measurement beams, one in the leading region and one in the trailing region. To this end, the optical measurement beam can be split into two partial beams which can be simultaneously guided in the leading region and in the trailing region. The partial beams may be provided in movable fashion.

The at least one optical measurement beam may comprise one or more of the following wavelengths: 1550 nm, 1310 nm, 1080 nm, 1030 nm and 830 nm. These wavelengths can be a central wavelength of an associated wavelength range of the optical measurement beam.

In preferred embodiments, the interferometer unit can be configured to determine a position of the surface of the workpiece and/or a topography of the surface of the workpiece on the basis of the distance measurement.

Furthermore, the interferometer unit can be configured to measure a distance to the processing region and/or a distance to a region of the workpiece that lies adjacent to the processing region.

The interferometer may comprise a coherence interferometer or a low coherence interferometer.

The interferometer may be configured to couple the at least one optical measurement beam into a beam path of the laser apparatus. The interferometer may also comprise a beam path for the optical measurement beam that is separated from the beam path of the laser apparatus.

In one exemplary embodiment, the at least one supply apparatus can be configured to supply a powder or a wire as supply material.

The at least one supply apparatus can be selected from a group that is selected from an annular jet powder nozzle, a multi-jet powder nozzle and an off-axis powder nozzle.

In a further exemplary embodiment, the at least one optical measurement beam and the laser beam can be coaxial or substantially coaxial. As an alternative or in addition thereto, the optical measurement beam may also, however, be inclined with respect to the laser beam or with respect to an optical axis of the laser apparatus.

The interferometer may be configured to provide the at least one optical measurement beam in static fashion with respect to the laser beam. As an alternative or in addition thereto, the interferometer can be configured to provide the optical measurement beam in movable fashion with respect to the laser beam.

In a further exemplary embodiment, a controller can be provided for controlling the laser apparatus and/or the at least one supply apparatus on the basis of the distance measured by the interferometer unit.

By way of example, the controller can be configured to provide closed-loop control of at least one process input variable selected from a movement direction of the apparatus with respect to the workpiece, movement speed with respect to the workpiece, powder flow speed, powder amount, powder composition, powder supply direction, wire supply direction, wire advance speed, operating distance, process gas composition, process gas pressure, laser focus diameter, position of the optical axis, laser focus position, laser pulse width and laser power.

The apparatus according to the invention can be a laser metal deposition head or may comprise the latter.

The apparatus according to the invention can be configured for a method for laser metal deposition (LMD) or cladding. The method according to the invention may comprise a method for laser metal deposition (LMD) or cladding.

The apparatus can be configured to determine at least one physical variable of the manufacturing process from the distance measurement during the additive manufacturing, i.e., during the laser metal deposition, for example a position and/or topography of the workpiece surface and/or a geometric variable of a welding bead (also referred to as component) manufactured during the process and/or a variable derived therefrom and/or a height of a deposited layer and/or a variable derived therefrom. Alternatively, one or more additional physical variables may also be captured, for instance a laser power and/or a dimension of the laser focus and/or a supply speed of a supply material and/or a material flow of the supply material and/or a dimension or a diameter of a melt pool arising during the process and/or a temperature of the melt pool and/or a variable derived from one or more of the aforementioned variables. Appropriate capturing means may be provided to this end.

The at least one physical variable can be captured or determined continuously or at time intervals of no more than 100 milliseconds, preferably no more than 20 milliseconds and expediently no more than 5 milliseconds, advantageous at equal time intervals.

Further, the apparatus can be configured to set at least one process parameter of the additive manufacturing, such as a focus position and/or a laser power, for example, as a function of the at least one determined or captured physical variable and/or its profile.

The at least one process parameter can be set in such a way that deviations from a model of the processing region or the welding bead and/or from a model of the additive manufacturing process are kept below an upper threshold and/or minimized, preferably by means of a closed-loop control method. To this end, the apparatus may comprise an open-loop and/or closed-loop control device, configured to set the at least one process parameter in such a way that deviations from the model are kept below an upper threshold and preferably minimized.

According to a further aspect of the invention, a method is specified for additive laser metal deposition of a component by means of a laser, comprising: capturing at least one physical variable of the welding process during the laser metal deposition and adjusting at least one process parameter of the method as a function of the at least one captured physical variable and/or the profile thereof.

Within the scope of the present application, additive laser metal deposition is expediently understood to mean the additive manufacture of preferably three-dimensional structures by means of laser metal deposition. The phrase "the welding process" is expediently understood to mean the process of laser metal deposition.

The method according to the invention allows a component to be manufactured precisely, even in the case of a change of physical variables of the laser metal deposition caused by drift or other disturbing influences. The deviations from the intended design of the component can be kept low in the method according to the invention. Consequently, a high manufacturing quality and a high process fidelity can be achieved by adapting process parameters on account of the value or the profile of the physical variables.

In particular, the method according to the invention also allows a manufacture of three-dimensional layer structures and components by means of laser metal deposition by virtue of being able to set a multiplicity of process parameters with precise fit for realizing the sought-after component geometry. Therefore, additive manufacturing of even relatively complex components can easily be implemented with the reliability required for industrial application by using the method according to the invention.

Preferably, the physical variable in the method according to the invention is at least one geometric variable of the component manufactured during the welding process and/or a variable derived therefrom and/or a height of a layer deposited during laser metal deposition and/or a variable derived therefrom. Particularly preferably, the at least one geometric variable in the method according to the invention is a height of the component or of the layer in the direction toward a beam direction of the laser used for laser metal deposition and striking the component. Expediently, a processing head is used for the laser metal deposition. Advantageously, this processing head allows a distance measurement between the processing head and the component, suitably by means of coherence tomography. In this way, it is possible to measure the distance between the processing head and the component contactlessly. Advantageously, the height of the component in the direction of the processing head can easily be ascertained from the distance between the processing head and the component, provided the position of the processing head is known in relation to a reference position, for instance a point at a side of the component facing away from the processing head or a point of a substrate at which this side of the component abuts. Expediently, the manufacturing device is configured to capture the relative position of the processing head with respect to such a reference position.

Preferably, within the scope of this invention, a "height of the component" is understood to mean the height of the component currently reached at the location of the material deposition during laser metal deposition: as known in 3D printing per se, the component is preferably manufactured layer-by-layer in the method for additive laser metal deposition according to the invention by virtue of a plurality of layers being deposited on one another in succession. To this end, a CAM (computer-aided manufacturing) model is preferably generated with the aid of a CAD model of the component, said CAM model providing a manufacture of successive layers of the component by means of laser metal deposition. Therefore, the current height of the component in this development of the invention is determined by the height of the component already obtained in preceding manufacturing steps and by the height of the currently manufactured layer. Consequently, depending on the configuration of the method according to the invention, preferably the current height of the component or else, alternatively or additionally and likewise preferably, the height of the currently deposited layer can be used as the at least one physical variable according to the invention.

In the method according to the invention, a supply device, in particular a powder conveyor, for welding material is used in an advantageous development of the invention for laser metal deposition and the at least one physical variable is at least a supply flow or material flow of the welding material and/or a supply speed of the supply device and/or a variable derived from one or more of the aforementioned variables. Expediently, a processing head is used in the method for additive laser metal deposition according to the invention, with the supply device ideally being housed in the processing head. Advantageously, the material flow or the supply speed of the supply device or a derived variable can be ascertained in the processing head itself such that there is no need for capturing means, for instance sensors, outside of the processing head. Consequently, the method according to the invention can be carried out robustly and reliably, even in the case of rough ambient conditions that are typical for laser metal deposition.

Suitably, in the method according to the invention, the at least one physical variable is at least a power of the laser and/or a dimension of a focus of the laser and/or a variable derived from one or more of the aforementioned variables.

Preferably, the laser metal deposition is implemented in a development of the method according to the invention with a melt pool and the at least one physical variable is at least a dimension of the melt pool and/or a temperature of the melt pool and/or a variable derived therefrom. Expediently, the melt pool is captured by a camera, more particularly a CCD camera, and the at least one dimension of the melt pool is ascertained by means of image processing. A processing head may also be used for the laser metal deposition and the at least one variable can be a distance between the processing head and the component and/or a variable derived therefrom. Advantageously, the dimension of the melt pool is related to the temperature of the melt pool in such a way that a higher temperature of the melt pool causes a greater dimension of the melt pool. Consequently, the at least one dimension of the melt pool is a measure for the temperature of the melt pool.

Expediently, the at least one process parameter in the method according to the invention is the position and/or the time profile of the position of the focus of the laser relative to the component and/or a variable derived therefrom. A deposition rate and/or a spatial deposition profile during laser metal deposition can easily be influenced by means of the position and/or the time profile of the focus of the laser. By way of example, laser metal deposition has a tendency to deposit welding material in increased or spatially heterogeneous fashion on the component during an acceleration of the focus of the laser and during a deceleration of the focus of the laser; consequently, the method according to the invention allows a height of an applied layer or a certain deposition rate to be adapted in tailored fashion, as it were, in a certain region of the component, i.e., directly targeted on a previously set geometric model of the component to be manufactured.

Suitably, in the method according to the invention the at least one variable is captured continuously, i.e., in an ongoing fashion, or at time intervals of no more than 100 milliseconds, preferably no more than 20 milliseconds and expediently no more than 5 milliseconds, preferably at equal time intervals. In this way, feedback of the at least one variable that is sufficiently continuous for the laser metal deposition is ensured in the method according to the invention such that the at least one process parameter is sufficiently quickly adjustable.

In an advantageous development of the invention, the at least one process parameter is adjusted in such a way during the method that deviations from a model of the component and/or of the laser metal deposition are kept below an upper threshold and/or minimized, preferably by means of a closed-loop control method. Consequently, the component can be manufactured in geometrically highly precise fashion by means of the method according to the invention. Particularly preferably, the component is manufactured layer-by-layer during the method according to the invention. Suitably, the at least one process parameter is adjusted in such a way in the process that the current height of the component corresponds to the current height of the component provided for in a process model of the method according to the invention. Alternatively or additionally and likewise particularly preferably, the height of the currently manufactured layer is determined from the model of the laser metal deposition, for instance a CAM model of the laser metal deposition, and the height of the currently manufactured layer is kept within predetermined limits, i.e., virtually constant.

Preferably, closed-loop control is implemented during the method according to the invention, within the scope of which the at least one physical variable forms a controlled variable and the at least one process parameter forms a manipulated variable. Expediently, the physical variable in the method according to the invention is the current height of the component and/or the height of a layer currently deposited during the laser metal deposition.

In a further aspect, a manufacturing device for additive laser metal deposition of a component by means of a laser is specified and, in particular, the manufacturing device is configured to carry out a method according to the invention for additive laser metal deposition as described above. The manufacturing device according to the invention comprises at least one capturing means for capturing at least one physical variable of the welding process and at least one actuating means for adjusting at least one process parameter as a function of the at least one captured physical variable and/or the profile thereof. The dependence of the adjustment of the at least one process parameter on the captured at least one variable is expediently controlled by means of a control device of the manufacturing device according to the invention.

In an advantageous development of the invention, the manufacturing device comprises a processing head for laser metal deposition and a distance capturing device which is embodied to measure the distance of the processing head from the component and/or which comprises a coherence tomography device or which is optically connected to the latter. This allows the distance of the processing head from the component to be measured contactlessly. Advantageously, the height of the component in the direction toward the processing head can easily be ascertained from the distance of the processing head from the component, provided the position of the processing head is known relative to a reference position as already described above in relation to the method according to the invention. Expediently, the manufacturing device is configured to capture the relative position of the processing head with respect to such a reference position.

The manufacturing device according to the invention preferably comprises a supply device for supplying powdery welding material for laser metal deposition, and at least one capturing means for capturing the supply speed and/or the material flow of the welding material. Suitably, the material flow is captured as a volume flow and/or mass flow. The volume flow, in particular, can easily be captured using imaging means.

In an advantageous development of the invention, the manufacturing device comprises at least one capturing means for capturing at least one dimension of a melt pool arising during laser metal deposition and/or at least one capturing means for capturing the temperature of the melt pool and/or at least one capturing means for capturing the power of the laser. Advantageously, the power of the laser is an internal variable, which is capturable, for example, by way of a preferably present control device of the manufacturing device, in particular in the form of a PC or CNC controller. Expediently, the capturing means for capturing the temperature of the melt pool comprises a capturing means for capturing at least one dimension of the melt pool. This is because the dimension of the melt pool depends on the temperature of the melt pool in such a way that a higher temperature of the melt pool causes a greater dimension of the melt pool. Preferably, the capturing means for capturing the at least one dimension comprises at least one CCD camera, which captures an image of the melt pool. The dimension can now be determined, for example by means of a preferably provided evaluation device, and so the temperature can be ascertained therefrom, for instance by means of calibration data determined in advance.

Suitably, the at least one actuating means in the manufacturing device according to the invention comprises at least one actuating means for adjusting the position of the focus of the laser or the profile thereof and/or at least one actuating means for adjusting the power of the laser. As already described above, the spatial material deposition can be influenced particularly easily by way of an acceleration of the focus of the laser in particular. Preferably, the actuating means is a processing head of the manufacturing device that is movable relative to the component, for instance within a plane or movable in three dimensions.

Expediently, the manufacturing device according to the invention comprises an open-loop and/or closed-loop control device that is configured to adjust the at least one process parameter in such a way that deviations from a model of the component or from a process model for the laser metal deposition are kept below an upper threshold and preferably minimized. Consequently, at least part of the provided geometric design of the component forms a controlled variable of the method according to the invention in this development of the invention.

Preferably, the manufacturing device comprises closed-loop control, within which the at least one physical variable forms a controlled variable and the at least one process parameter forms a manipulated variable.

It is self-evident that aspects of the embodiments can be combined with one another as desired. Preferred, optional embodiments and particular aspects of the disclosure emerge from the dependent claims, the drawings and the present description.

The invention provides monitoring and/or closed-loop control of additive manufacturing by means of laser beams and a supply material (also referred to as "supply material" or "additional material"). The sensor principle used is interferometry for measuring the distance, such as optical low-coherence interferometry, for example. By way of example interferometry can be used in the lead-in of the process for determining the position of the surface to be processed and/or trailing the measurement of the resultant topography of the deposited material.

Consequently, the present invention provides an online (or in situ) sensor technique for exactly measuring the process results in the form of a geometry measurement, as a result of which improved process control, more particularly improved closed-loop and/or open-loop process control, can be achieved.

BRIEF DESCRIPTION OF THE DRAWINGS

Exemplary embodiments of the disclosure are illustrated in the figures and described in more detail below. In detail.

EMBODIMENTS OF THE DISCLOSURE

Provided nothing else is specified, the same reference signs are used below for the same elements and elements with the same effect.

Figure 1:
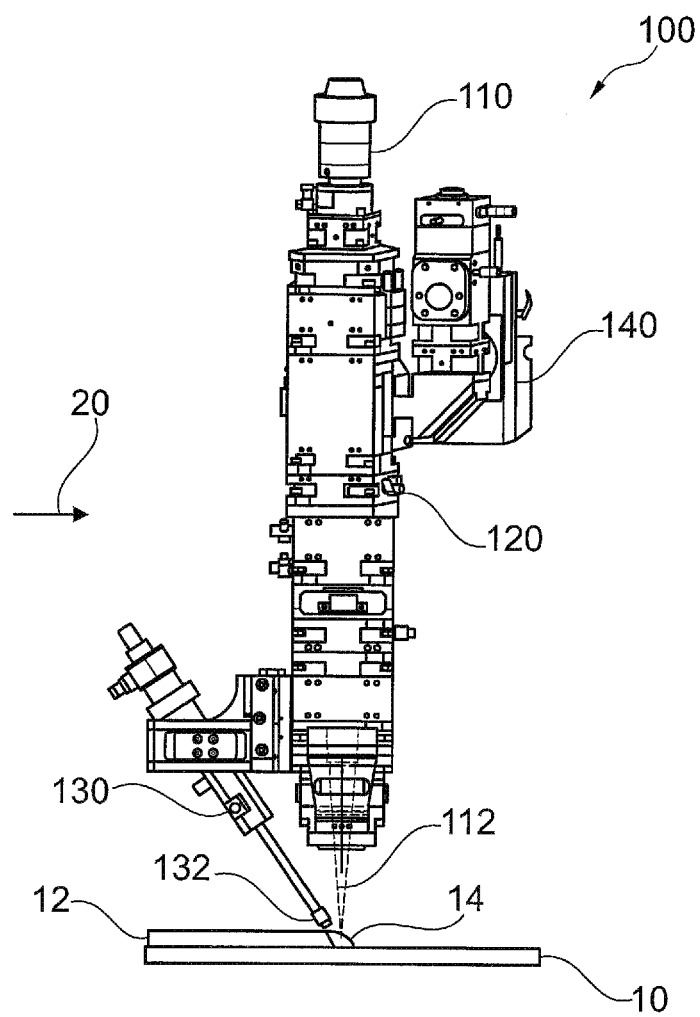
FIG. 1 shows a schematic illustration of an apparatus for additive manufacturing, comprising a static optical measurement beam according to embodiments of the present disclosure.

FIG. 1 shows a schematic illustration of an apparatus 100 for additive manufacturing, or a manufacturing device for additive laser metal deposition, comprising a static optical measurement beam according to embodiments of the present disclosure. The apparatus 100 may be a laser metal deposition head.

The apparatus 100 for additive manufacturing comprises a laser apparatus 110 for material processing by means of a processing beam or laser beam 112 (e.g., a laser processing head), the laser apparatus 110 being configured to direct the laser beam 112 onto a processing region of a workpiece 10, at least one supply apparatus 130 for a supply material, which is configured to supply the supply material to the processing region, and an interferometer unit with an interferometer 140, which is configured to measure a distance from the workpiece 10 by means of an optical measurement beam. According to embodiments, the apparatus 100 can be movable along a processing direction 20. The processing direction 20 can be a movement direction of the apparatus 100 with respect to the workpiece 10. In particular, the processing direction can be a horizontal direction.

According to the present invention, an interferometer, such as a low-coherence interferometer, for example, is used for measuring the distance. By way of example, interferometry can be used in the leading region of an LMD process for determining the position of the surface of the workpiece to be processed and/or in the trailing region for measuring the resultant topography of the deposited material. This provides an online sensor technique for exactly measuring the process result in the form of a geometry measurement, as a result of which improved process control and/or open-loop or closed-loop process control can be achieved.

As illustrated in exemplary fashion in FIG. 1, the interferometer 140 can be configured to provide the optical measurement beam in substantially static fashion with respect to the laser beam 112. However, the present disclosure is not restricted thereto and the interferometer 140 can be configured to provide the optical measurement beam in dynamic, i.e., movable, fashion with respect to the laser beam 112, as is shown in FIGS. 2, 4A, 4B, 6A, 6B and 7, for example.

According to embodiments, the apparatus 100 can be used for laser metal deposition (LMD), in which the laser beam 112 and the supply material are used to deposit material on the workpiece 10. As illustrated in FIG. 1, the laser beam 112 produces a melt pool 14 on a surface of the workpiece 10. By means of the supply apparatus 130, such as a nozzle 132, for example, the supply material, which may be a metal powder, for example, is introduced into the melt pool 14. Material regions that are welded to one another arise, said material regions yielding structures such as a welding bead 12, for example, on existing workpieces. Likewise, the apparatus 100 can be used for so-called high-speed cladding, in which no melt pool is produced but the molten powder strikes the workpiece surface and is deposited thereon.

The apparatus 100, and in particular the laser apparatus 110, may comprise a focusing optical unit 120 for focusing the laser beam 112 onto the workpiece 10. The focusing optical unit 120 defines an optical axis. By way of example, the focusing optical unit 120 can be an optical system with a fixed focal length or with a variable focal length (zoom). The focusing optical unit 120 may comprise at least one imaging optical element that defines the optical axis. By way of example, a diverging laser light beam emerging from an optical fiber of the laser apparatus 110 is reshaped into a parallel laser light beam by means of a collimator optical unit, said parallel laser light beam being focused onto the workpiece 10 by a focusing lens.

The interferometer unit is configured to measure by means of the optical measurement beam, which may be a laser beam, a distance from the workpiece 10, for example with respect to a reference point defined by the interferometer 140. The interferometer 140 can be a coherence interferometer and, more particularly, a low-coherence interferometer. Measuring the distance by means of an interferometer is known and will not be explained in any more detail. In particular, the interferometer 140 can be configured to measure a change in distance while the apparatus 100 is moved along the processing direction 20 and/or while the measurement beam is moved over the surface of the workpiece. By way of example, this can implement a topography measurement.

According to embodiments that can be combined with other embodiments described herein, the interferometer unit is configured to measure a distance from the processing region. By way of example, a topography measurement can be carried out trailing the determination of the geometry of the region processed by the apparatus, such as a deposited welding bead. According to embodiments, the topography measurement can be used for detecting faults and/or closed-loop control of one or more process input variables. By way of example, the process input variables can be a powder flow, a wire advance, a process speed, a laser power, an operating distance, etc.

In some embodiments, the interferometer unit can be configured to measure a distance from a region of the workpiece 10 that lies adjacent to the processing region. The region can be an unprocessed surface of the workpiece 10. By way of example, a topography measurement in the leading region (e.g., a z-position of the workpiece surface) can be used as a reference measurement and/or for process guidance.

The sensor system of the present disclosure is based on interferometry, such as low-coherence interferometry, for example. To this end, a measurement beam is provided off axis in static or movable fashion by the interferometer. Alternatively, the measurement beam provided by the interferometer is coupled into the optical beam path of the processing laser and overlaid into the interaction zone coaxially or virtually coaxially in static or movable fashion.

In some embodiments, the interferometer 140 may comprise a beam path for the optical measurement beam that is separate from the beam path of the laser apparatus 110. In some embodiments, the interferometer 140 can be configured to direct the optical measurement beam onto the workpiece 10 in tilted or angled fashion with respect to the optical axis of the laser apparatus 110. By way of example, the interferometer 140 may comprise an off-axis beam path for the optical measurement beam that is separate from the beam path of the laser apparatus 110, with an angled incidence of the optical measurement beam being able to be implemented in the trailing region, for example. A measurement of the height of the deposited welding bead may be implemented, wherein the interferometer 140 may be statically positioned in the trailing region. In further embodiments, the topography can be measured, for example by means of a 1D or 2D oscillation in the trailing region. According to further embodiments, the interferometer 140 can be configured to couple the optical measurement beam into a beam path of the laser apparatus 110. The optical measurement beam can be substantially coaxial to the laser beam 112. In some embodiments, the at least one supply apparatus 130 is configured to output a powder jet as supply material.

The distance measurement can be implemented by the interferometer unit by means of a static or movable optical measurement beam, for example by means of a measurement beam that rotates about the processing laser or the laser beam 112 or that has any desired deflection with respect to an optical axis of the laser apparatus. As a result of this, the height of the deposited welding bead can be measured, wherein the interferometer or the optical measurement beam may be positioned statically in the trailing region (unidirectionally, e.g. along the processing direction 20). In further embodiments, there can be a measurement of, e.g., the main material and/or application height in the leading and/or trailing region (e.g., statically positioned; unidirectionally along the processing direction 20). Alternatively, the topography can be measured (e.g., rotating by scanner; multi-directionally). Optionally, the powder density can be measured ("disturbance" of the optical measurement signal by the powder flow).

According to embodiments that can be combined with other embodiments described here, the apparatus 100 further comprises a controller that is configured to carry out open-loop and/or closed-loop control of the laser apparatus 110 and/or the at least one supply apparatus 130 on the basis of the distance measured by the interferometer. The open-loop control can be implemented on the basis of interferometry carried out in the leading region and/or trailing region.

Typically, process control and/or process guidance can be implemented on the basis of the distance measured by the interferometer. By way of example, a processing speed, a laser power, a laser focus and/or operational parameters of the supply apparatus, such as a powder flow or a wire advance, can be controlled or set on the basis of the interferometry. As an alternative or in addition thereto, the interferometry can be carried out for quality control of the region processed by the apparatus, e.g., a deposited welding bead.

According to embodiments that can be combined with other embodiments described herein, the at least one supply apparatus 130 is selected from a group consisting of an annular jet powder nozzle, a multi-jet powder nozzle and an off-axis powder nozzle. FIG. 1 illustrates an off-axis powder nozzle 132 (also referred to as "lateral powder nozzle") in exemplary fashion. The off-axis powder nozzle 132 is a light, simple and robust system that is distinguished, in particular, by good accessibility even in the case of poorly reachable welding positions.

Figure 2:
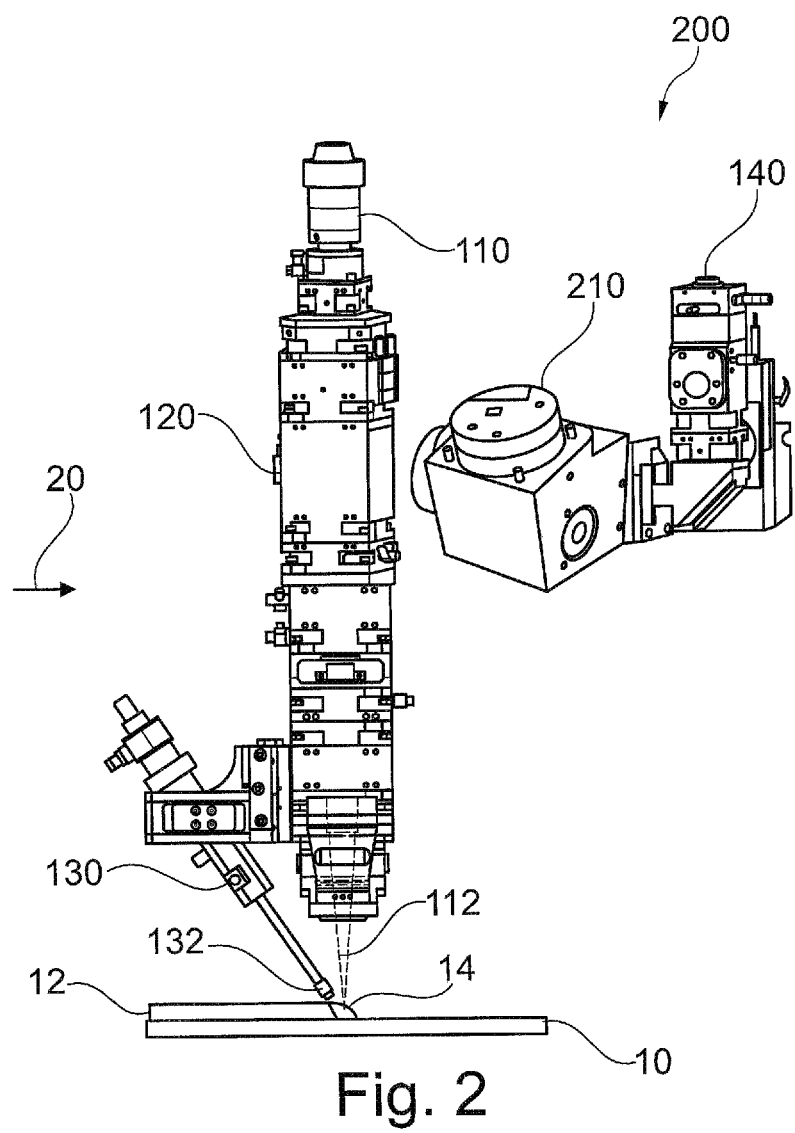
FIG. 2 shows a schematic illustration of an apparatus for additive manufacturing, comprising a locally movable optical measurement beam according to embodiments of the present disclosure, FIGS. 3A and B show a schematic illustration of an apparatus and of a beam path, respectively, for additive manufacturing, comprising a static optical measurement beam according to embodiments of the present disclosure, FIGS. 4A and B show a schematic illustration of an apparatus and of a beam path, respectively, for additive manufacturing, comprising a locally movable optical measurement beam according to embodiments of the present disclosure, FIGS. 5A and B show a schematic illustration of an apparatus and of a beam path, respectively, for additive manufacturing, comprising a static optical measurement beam according to further embodiments of the present disclosure, FIGS. 6A and B show a schematic illustration of an apparatus and of a beam path, respectively, for additive manufacturing, comprising a locally movable optical measurement beam according to further embodiments of the present disclosure.

FIG. 2 shows a schematic illustration of an apparatus 200 for additive manufacturing, comprising a movable optical measurement beam according to embodiments of the present disclosure, such as a rotating optical measurement beam, for example.

In some embodiments, the interferometer 140 can be configured to provide the optical measurement beam in movable or dynamic fashion with respect to the laser beam 112. In particular, the interferometer 140 can be configured to rotate the optical measurement beam around the laser beam 112. The optical measurement beam can scan a two-dimensional contour, such as a circular contour, for example, on the workpiece 10. As a result of this, the topography of the deposited welding bead, for example, can be measured.

The apparatus 200 and, in particular, the interferometer 140 may comprise a drive 210 that is configured to move or scan the optical measurement beam over the workpiece. Typically, the interferometer 140 comprises one or more optical elements such as lenses, mirrors or wedge plates that deflect the optical measurement beam in order to direct the latter onto the workpiece 10. At least one optical element of the one or more optical elements may be movable in order to move or scan the optical measurement beam over the workpiece 10. Alternatively, the drive can be a mechanical drive, e.g., a rotary drive, that moves the interferometer 140 in order to move or scan the optical measurement beam over the workpiece 10.

Figure 3A:
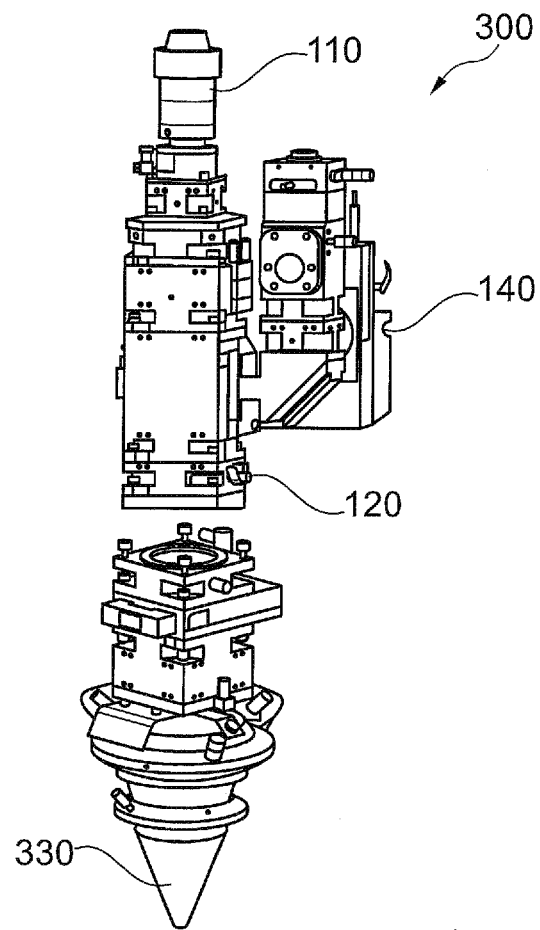

FIGS. 3A and B show a schematic illustration of an apparatus 300 and of a beam path, respectively, for additive manufacturing, comprising a static optical measurement beam 142 according to embodiments of the present disclosure.

The apparatus 300 comprises an annular jet powder nozzle 330. In particular, the annular jet powder nozzle 330 can be configured to output a powder jet as supply material. The optical measurement beam 142 can be substantially coaxial or inclined with respect to the laser beam 112. The powder jet 134 can be directed onto a first point or a first region outside of the annular jet powder nozzle 330, which may be on or above the processing region of the workpiece. The laser beam 112 can be directed on a second point (e.g., a focal point) or second region outside of the annular jet powder nozzle 330, which may be on the processing region.

Figure 3B:
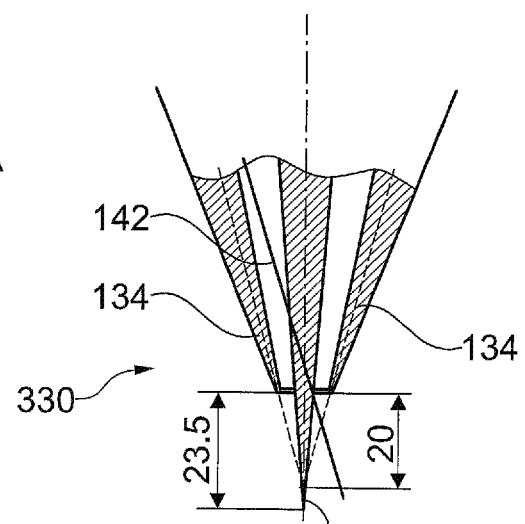

The first point and the second point can overlap or can be spaced apart. As shown in the example of FIG. 3B, the first point or the first region can be arranged approximately 20 mm outside of (e.g., below) an output of the annular jet powder nozzle 330 and/or of an output of the focusing optical unit 120. The second point or second region can be arranged approximately 23.5 mm outside of (e.g., below) the output of the annular jet powder nozzle 330 and/or the output of the focusing optical unit 120. The numerical data is merely exemplary and should not restrict the embodiment illustrated in FIG. 3B thereto. The first point and the second point can be arranged vertically above one another. The optical measurement beam 142 can be directed onto a point or region of the workpiece that is horizontally offset from the first point and/or second point.

Figure 4A:
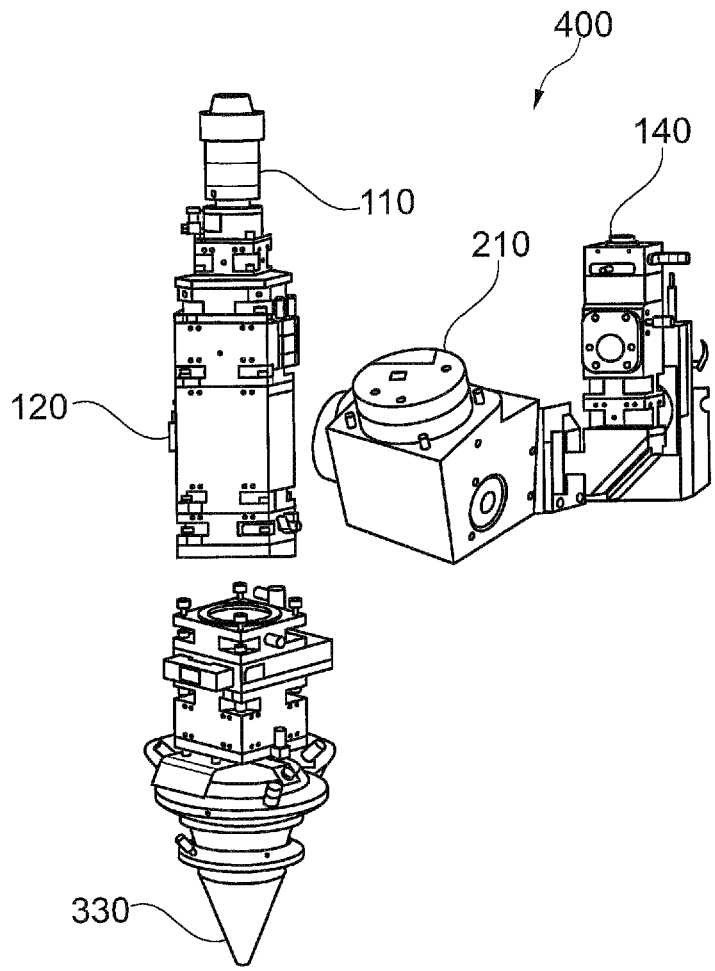
Figure 4B:
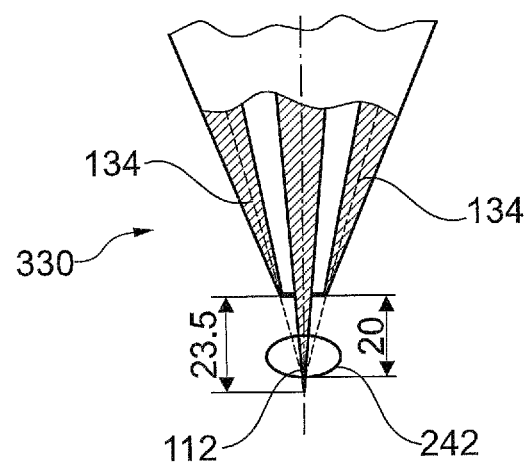

FIGS. 4A and B show a schematic illustration of an apparatus 400 and of a beam path, respectively, for additive manufacturing, comprising a movable, e.g., rotating, optical measurement beam according to embodiments of the present disclosure.

The apparatus 400 comprises the annular jet powder nozzle 330, as described with reference to FIGS. 3A and B. The optical measurement beam is dynamic, i.e., spatially movable. In particular, the optical measurement beam can rotate about the laser beam 112 and/or the optical axis of the focusing optical unit 120. The optical measurement beam may scan a two-dimensional contour 242, such as a circular contour, for example, on the workpiece 10. As a result of this, a topography of the deposited welding bead, for example, can be measured. The optical measurement beam 142 can be substantially coaxial or inclined with respect to the laser beam 112.

Figure 5A:
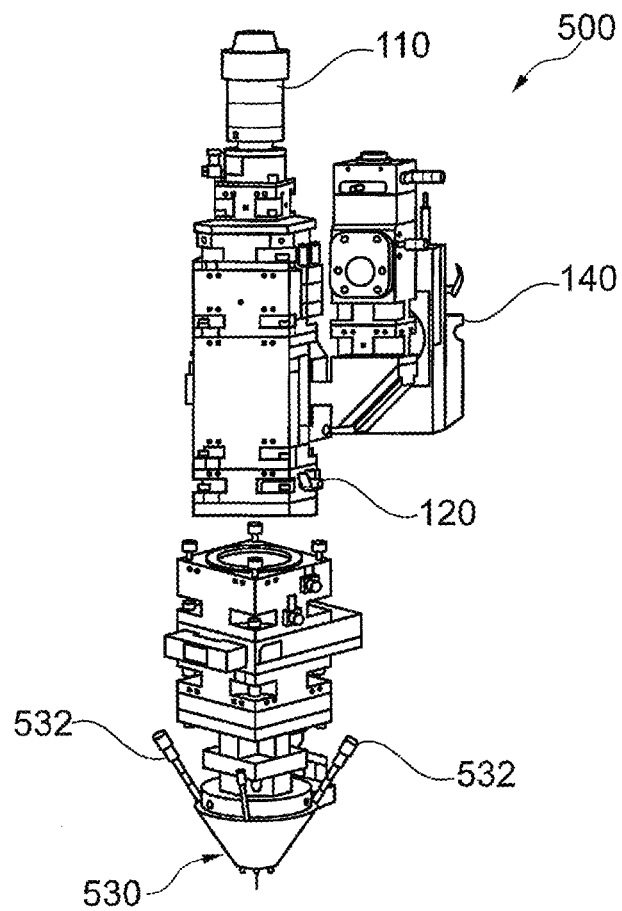

FIGS. 5A and B show a schematic illustration of an apparatus 500 and of a beam path, respectively, for additive manufacturing, comprising a static optical measurement beam 142 according to further embodiments of the present disclosure.

The apparatus 500 comprises a multi-jet powder nozzle 530. The multi-jet powder nozzle 530 may comprise at least two powder nozzles 532, which are configured to each supply a powder jet to the processing region on the workpiece. Typically, the multi-jet powder nozzle 530 comprises four powder nozzles 532, which are arranged at an angle with respect to one another.

Figure 5B:
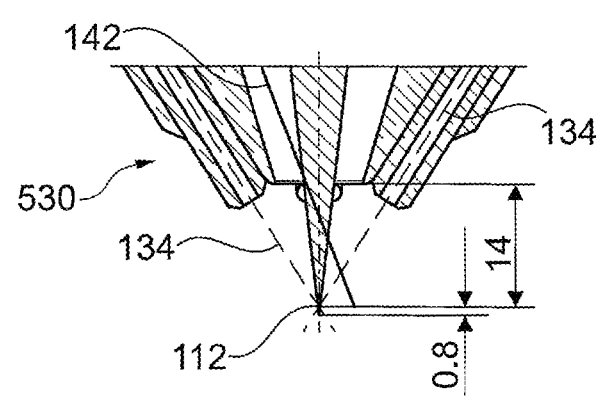

As shown in FIG. 5B, the powder jets 134 of the at least two powder nozzles 532 can be directed onto a first point or a first region outside of the multi-jet powder nozzle 530, which may be on or above the processing region of the workpiece. The laser beam 112 can be directed onto a second point (e.g., a focal point) or a second region outside of the multi-jet powder nozzle 530, which may be on the processing region. The optical measurement beam 142 can be substantially coaxial or inclined with respect to the laser beam 112.

The first point and the second point can overlap or can be spaced apart. As shown in the example of FIG. 5B, the first point or the first region can be arranged approximately 14 mm outside of (e.g., below) an output of the multi-jet powder nozzle 530 and/or of an output of the focusing optical unit 120. The second point or second region can be arranged approximately 0.8 mm further, i.e., approximately 14.8 mm, outside of (e.g., below) the output of the multi-jet powder nozzle 530 and/or the output of the focusing optical unit 120. The numerical data is merely exemplary and should not restrict the embodiment illustrated in FIG. 5B thereto. The first point and the second point can be arranged vertically above one another. The optical measurement beam 142 can be directed onto a point or region of the workpiece that is horizontally offset from the first point and/or second point.

Figure 6A:
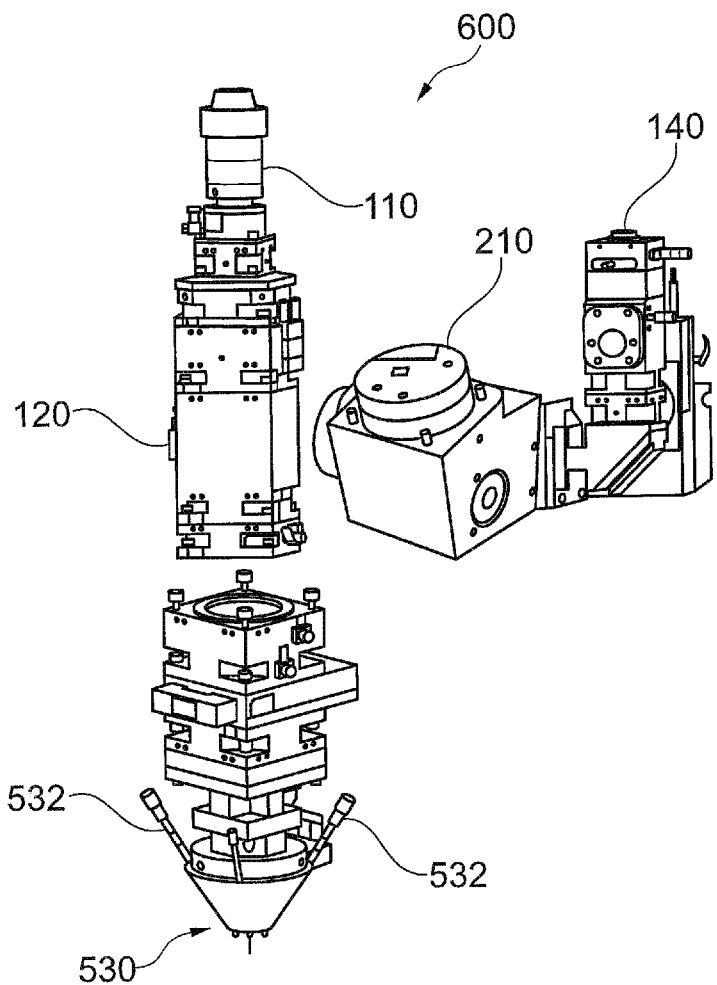
Figure 6B:
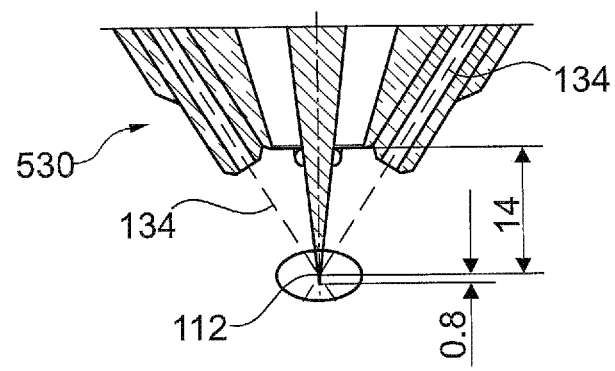

FIGS. 6A and B show a schematic illustration of an apparatus 600 and of a beam path, respectively, for additive manufacturing, comprising a rotating optical measurement beam according to further embodiments of the present disclosure.

The apparatus 600 comprises the multi-jet powder nozzle 530, as described with reference to FIGS. 5A and B. The optical measurement beam is dynamic, i.e. spatially movable. By way of example, the optical measurement beam can rotate about the laser beam 112 and/or the optical axis of the focusing optical unit 120 or can be radiated-in with a deflection in this respect. The optical measurement beam can scan a two-dimensional contour, such as a circular contour, for example, on the workpiece 10. As a result of this, a topography of the deposited welding bead, for example, can be measured. The optical measurement beam 142 can be substantially coaxial or inclined with respect to the laser beam 112.

Figure 7:
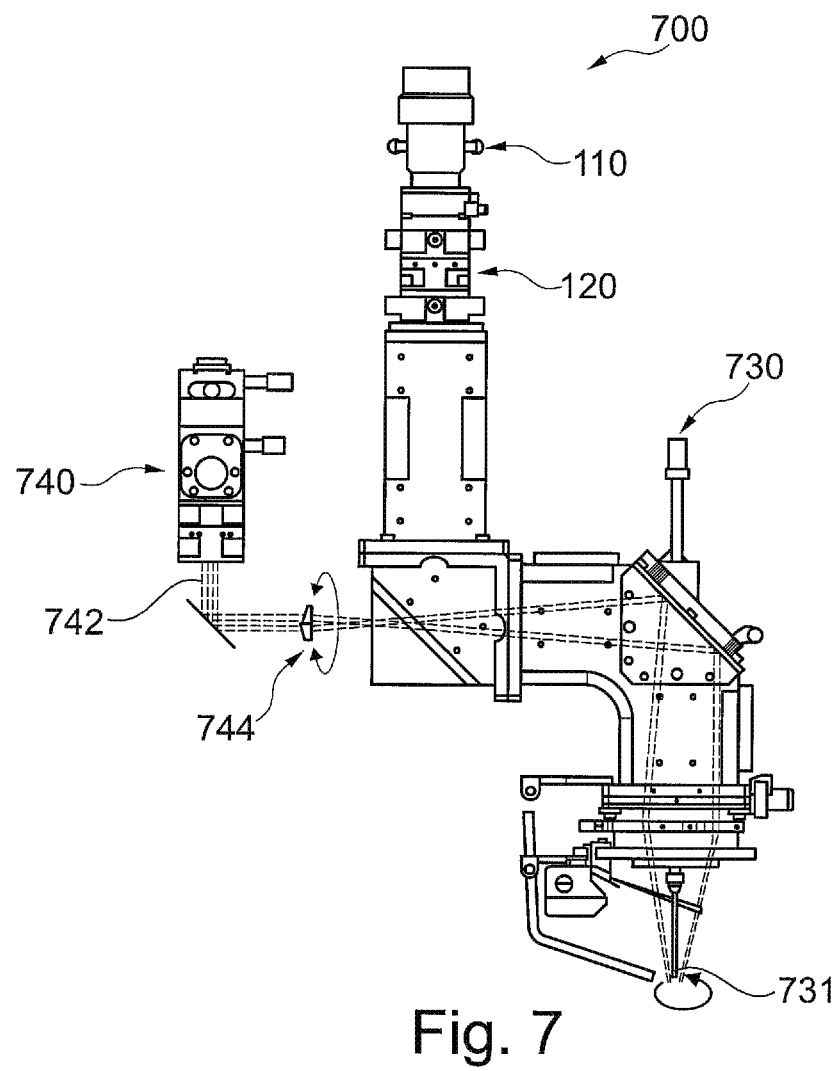
FIG. 7 shows a schematic illustration of an apparatus for additive manufacturing according to even further embodiments of the present disclosure.

FIG. 7 shows a schematic illustration of an apparatus 700 for additive manufacturing according to even further embodiments of the present disclosure. The apparatus 700 can be configured for wire deposition welding.

According to embodiments that can be combined with other embodiments described herein, the at least one supply apparatus 730 is configured to output a wire 731 as supply material. The wire 731 can be a metal wire, for example.

The optical measurement beam 742 can be provided off axis or substantially coaxial with respect to the laser beam. An off-axis measurement beam, which is provided in a separate beam path (e.g., oblique incidence in the trailing region), can be used to carry out a measurement of the topography, for example by way of a 1D or 2D oscillation in the trailing region. In the case of the beam-coaxial configuration, the height of the deposited welding bead can be measured, wherein the interferometer 740 can be positioned statically in the trailing region (unidirectionally, e.g., along the processing direction). Moreover, the topography can be measured for example using at least two rotatably mounted wedge plates 744 (multi-directionally) in the case of a dynamic or movable configuration. Here, the optical measurement beam 742 is split into two partial beams by the two wedge plates 744. As a result, one of the partial beams can be moved in the leading region and one can be moved in the trailing region in each case, for example, such that the topography is captured in both regions at the same time.

Figure 8:
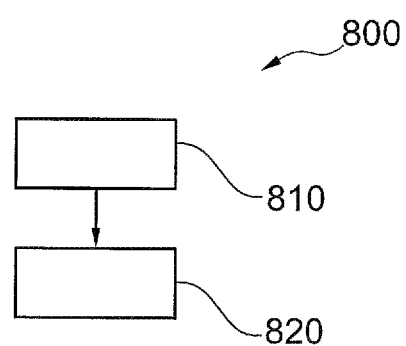
FIG. 8 shows a flowchart of a method for additive manufacturing according to embodiments of the present disclosure.

FIG. 8 shows a flowchart of a method 800 for additive manufacturing according to embodiments of the present disclosure. The method can be implemented using the apparatus, described here, for additive manufacturing.

In step 810, the method comprises steering a laser beam onto a processing region of a workpiece and supplying a supply material to the processing region. In step 820, the method further comprises measuring a distance from the workpiece using an interferometer unit that comprises an interferometer.

Figure 9B:
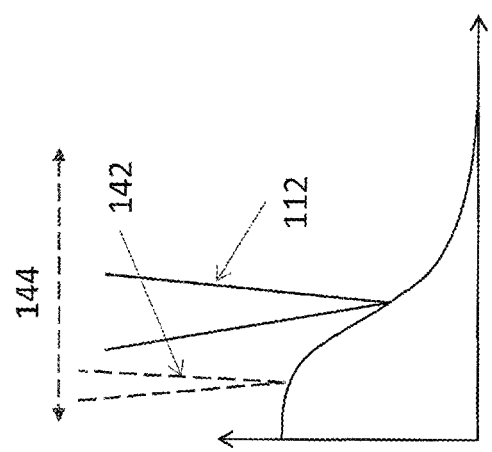
FIGS. 9A to 9C are schematic illustrations of possible guides of the optical measurement beam and FIG. 9D is a graphical illustration of a measurement by means of an optical measurement beam carrying out a linear scanning movement in the leading and trailing region of the laser beam.
Figure 9A:
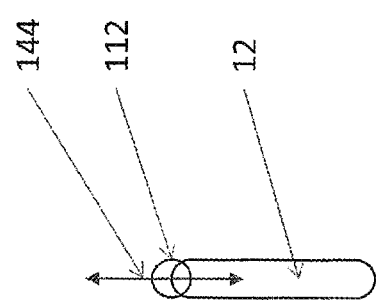
Figure 9D:
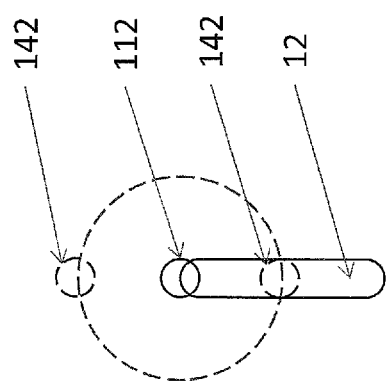
Figure 9C:
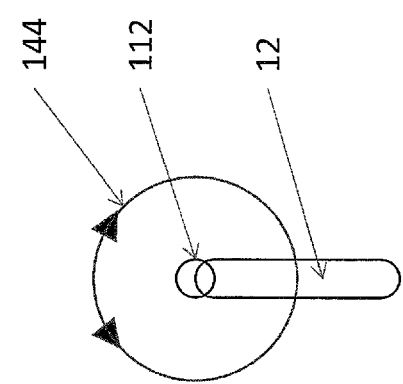

FIG. 9A illustrates a linear scan figure 144 of the optical measurement beam 142. Here, the optical measurement beam 142 is moved back and forth between a position in the leading region and a position in the trailing region, i.e., parallel to the processing direction, and can capture the geometry or the profile of the welding bead 12 in the process. The measurement result of this linear scanning movement 144 is illustrated in FIG. 9B: FIG. 9B shows a height profile of the welding bead 12 along the processing direction just before and just after the processing point or the laser beam 112. FIGS. 9C and 9D show alternative scanning movements 144: in FIG. 9C, the optical measurement beam 142 is guided in a circle about the processing point or the laser beam 112, for example, such that there is a (sequential) measurement in the leading and trailing regions. In FIG. 9D, two optical measurement beams are guided together along a circular figure about the processing point or the laser beam 112 such that there can be a simultaneous measurement in the leading region and in the trailing region. Moreover, a lateral topography of the welding bead 12 can be captured along the scan figure. The scan figure or the scanning movement 144 can be updated in the processing direction.

In the embodiments of the present invention, the optical measurement beams 142 can have at least one of the following central wavelengths: 1550 nm, 1310 nm, 1080 nm, 1030 nm and 830 nm.

Figure 10:
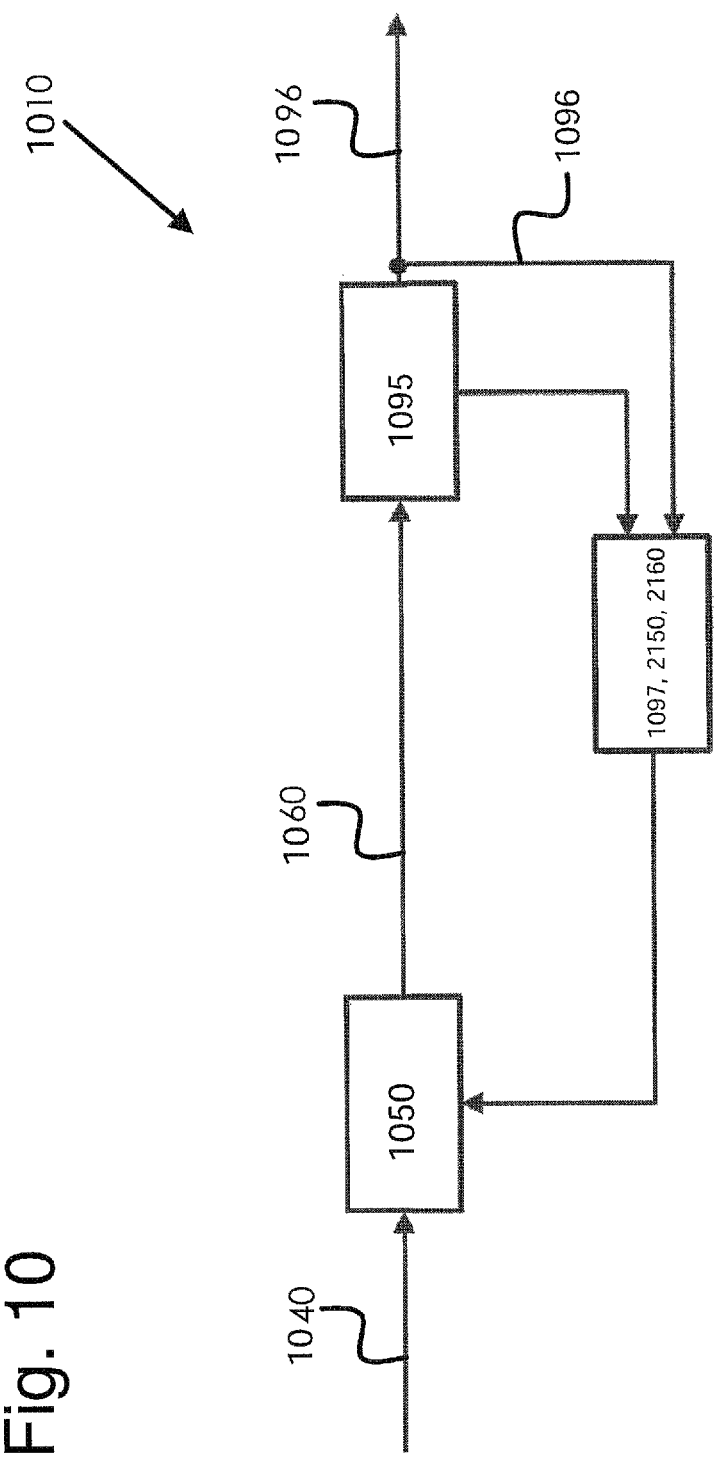
FIG. 10 shows a method according to the invention for 3D printing of a component, schematically in a schematic sketch.
Figure 11:
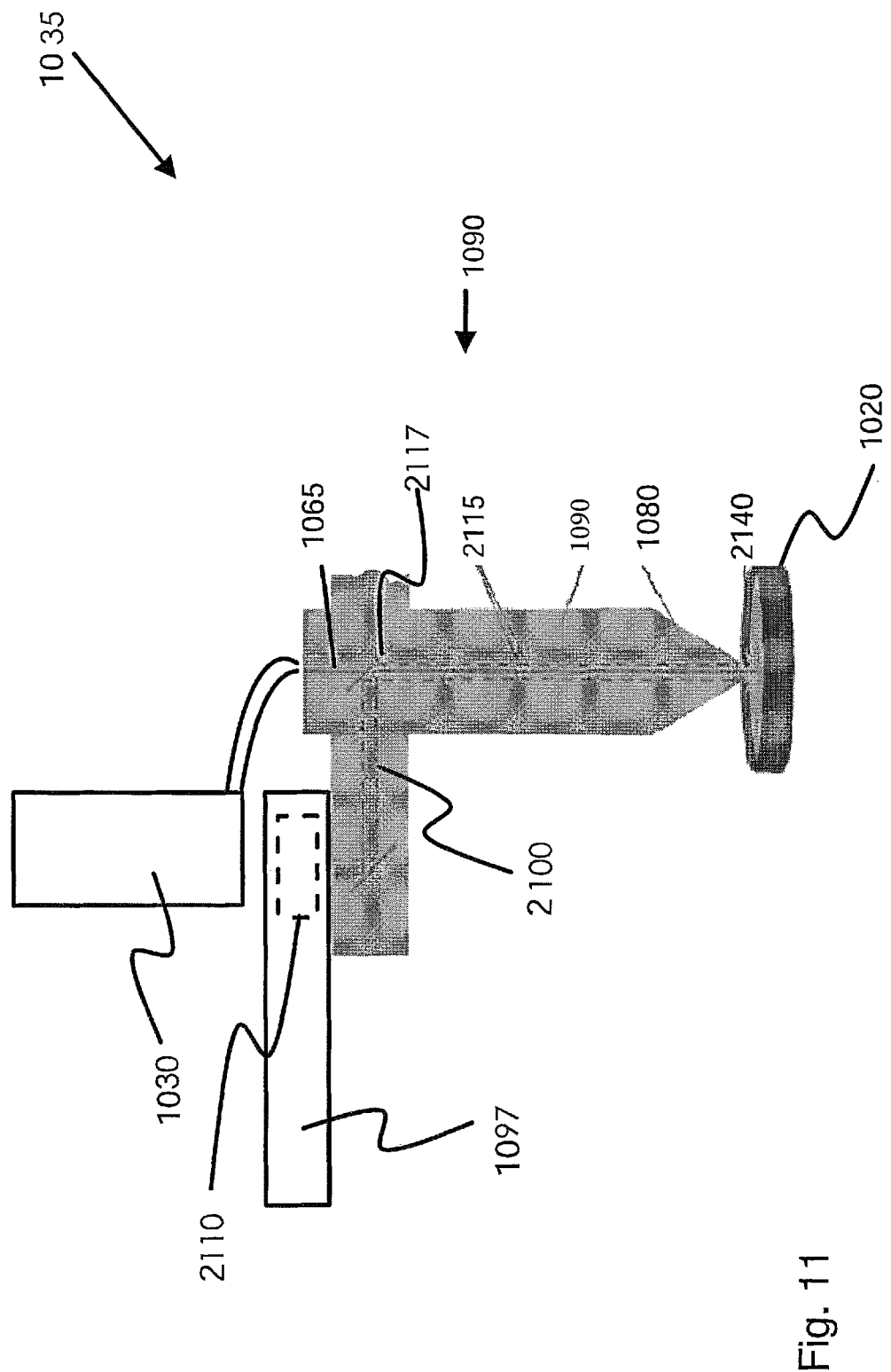
FIG. 11 shows part of a manufacturing device according to the invention for 3D printing of the component according to the method as per FIG. 10, schematically in a longitudinal section.
Figure 12:
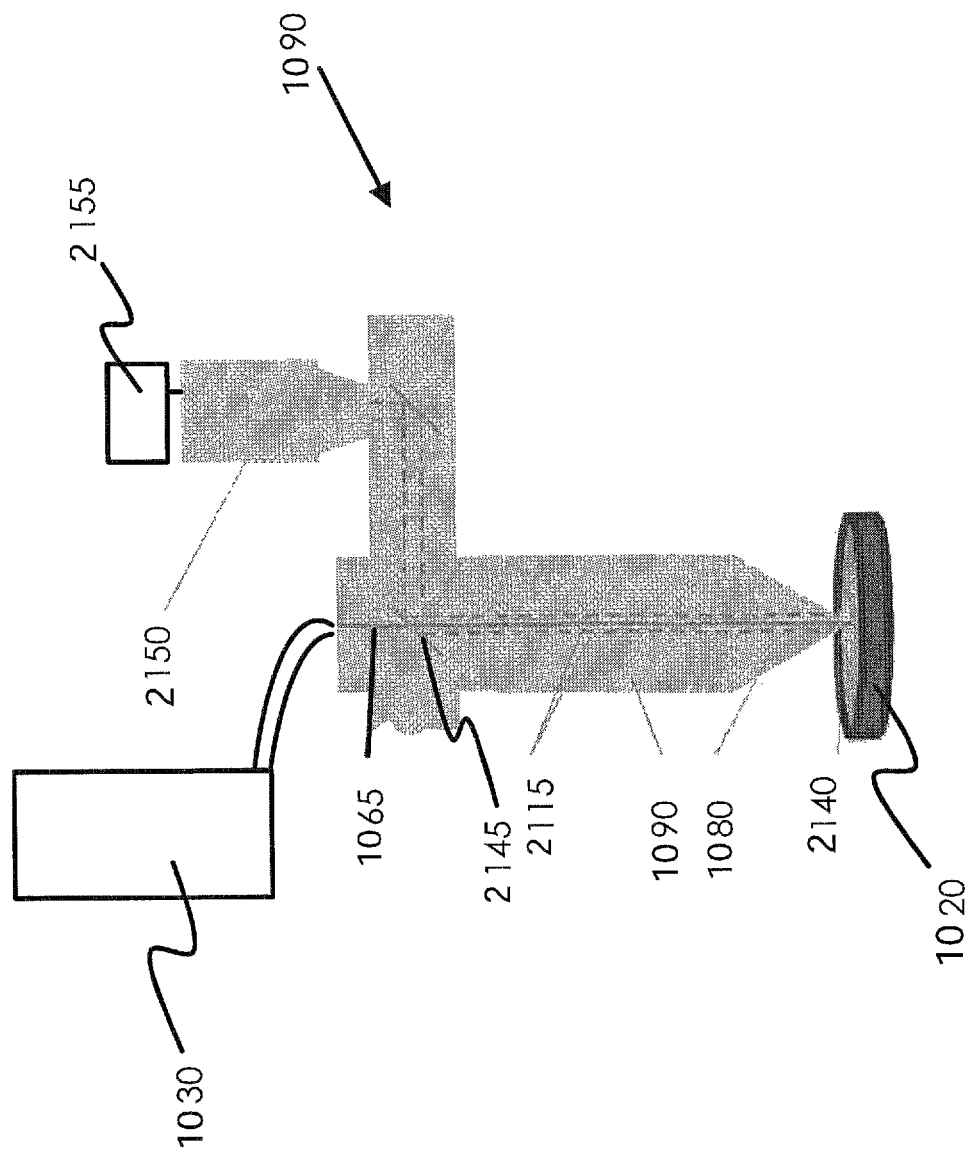
FIG. 12 shows part of the manufacturing device according to the invention as per FIG. 11 for 3D printing of the component according to the method as per FIG. 10, schematically in a longitudinal section.

The further method 1010 according to the invention for additive laser metal deposition, shown in FIG. 10, is a 3D printing method, by means of which a welding bead or a component 1020 is manufactured by means of laser metal deposition using a laser 1030 of an apparatus according to the invention for additive manufacturing or manufacturing device 1035 as illustrated in FIGS. 11 and 12.

In the method, an intended component height is derived from a CAD model of the component 1020 and a layer height 1040 for depositing a layer by means of laser metal deposition is determined on the basis of a CAM model for manufacturing the component 1020. The layer height 1040 forms a controlled variable of the method 1010 according to the invention.

This controlled variable is transferred to a controller 1050, which determines a set of process parameters 1060 for laser metal deposition from the intended layer height 1040, said process parameters serving as manipulated variables of the method 1010 according to the invention. In the illustrated exemplary embodiment, the process parameters 1060 comprise a power of a light 1065 of the laser 1030 and a position of a focus of the laser 1030 and a material flow of a powdery welding material 1070 through a nozzle 1080 of a process head 1090 of the manufacturing device 1035 according to the invention.

The component 1020 is welded by means of laser metal deposition 1095 using this set of process parameters 1060. An actual height 1096 of the layer emerges during the laser metal deposition 1095, said actual height being ascertained by way of the distance between the nozzle 1080 of the process head 1090 and the component 1020. An optical coherence tomography device 1097 is used for ascertaining this, the former being used to couple a measurement light 2100 of a light source 2110 of the coherence tomography device into the beam path 2115 of the laser 1030, serving to manufacture the component 1020 during laser metal deposition 1095, in the process head 1090. Here, the light of the laser 1030 and the measurement light 2100 are in each case combined by means of a partly transmissive mirror 2117 toward the nozzle 1080 in the downstream direction of the light 1065 of the laser 1030 and separated from the nozzle 1080 in the upstream direction of the light 1065 of the laser 1030. The light of the laser 1030 and the measurement light 2100 do not spectrally coincide, and so the measurement light 2100 can be evaluated largely undisturbed by components of the light of the laser 1030. Reflections of the measurement light 2100 of the light source 2110, occurring during the laser metal deposition, return into the beam path 2115 in the process head 1090. In the process head 1090, the reflections are decoupled and interferometrically compared to the measurement light 2100 of the light source 2110 originally fed into the process head 1090. The distance is obtained from this comparison. The coherence tomography device 1097 and the optical beam path 2115 contained in the process head 1090, including the optical elements situated in the beam path 2115, form a distance sensor within the scope of the interaction. This distance sensor is known per se and known as an in-process-depth-meter by Precitec GmbH for other welding processes than the ones specified here, specifically for laser welding, and is described in document DE10 102014 011 569 A1.

The use of this distance sensor requires filtering of the distance signals received: this is because, in contrast to the already known use of the above-described distance sensor in laser welding methods, the use of the distance sensor for laser metal deposition requires the influence of powdery welding material 1070 be taken into account, said powdery welding material emerging from the nozzle 1080 and being deposited on the component 1020 and blocking some of the optical signal of the distance sensor. This is because this welding material 1070 absorbs a large part of the measurement light 2100 of the light source 2110 of the coherence tomography device 1097. Filtering the distance signals therefore ensures the robustness of the method according to the invention.

For filtering purposes, all captured distance values are initially recorded along a time window, 20 milliseconds in the present case, 4 milliseconds in further exemplary embodiments not separately illustrated here. Subsequently, a filter value is determined from these captured distance values, said filter value being applied to temporally successive time windows of the same time duration of 20 milliseconds (or 4 milliseconds in further exemplary embodiments). If the laser 1030 is deactivated, only one-sided scattering occurs such that use is made here of a maximum filter, which filters out the greatest measured distance values as a measure for the actual distance. If an analysis of the measured distance values within a time window yields that two-sided scattering occurs, the distance value that unifies most measurement data is thus considered; i.e., the measurement data are subjected to filtering according to the most frequent value in the distribution of the distance values, i.e., to a "mode filter". This filtering takes account of the fact that the distance value with the highest density of measurement data reliably specifies the distance from the melt pool.

The actual height 1096 of the layer deposited by means of laser metal deposition is obtained from the distance obtained thus.

Further physical variables of the laser metal deposition can moreover be captured within the scope of the method according to the invention: thus, the temperature of a melt pool 2140 arising during laser metal deposition can additionally be determined. To this end, the melt pool 2140 is observed by means of a CCD camera 2150, for example, of the manufacturing device 1035. For the purposes of observing the melt pool 2140, some of the light reaching the optical beam path 2115 of the processing head 1090 through the nozzle 1080 from the melt pool 2140 is decoupled using a partly transmissive mirror 2145 and imaged onto the CCD camera 2150. The CCD camera 2150 is connected to an evaluation device 2155 of the manufacturing device 1035. By way of an algorithm, the evaluation device 2155 evaluates the image of the melt pool 2140, captured by means of the CCD camera 2150, and determines a mean diameter of the melt pool 2140. The evaluation device 2155 receives calibration data, by means of which the temperature of the melt pool 2140 is deduced from the mean diameter of the melt pool 2140.

Figure 13:
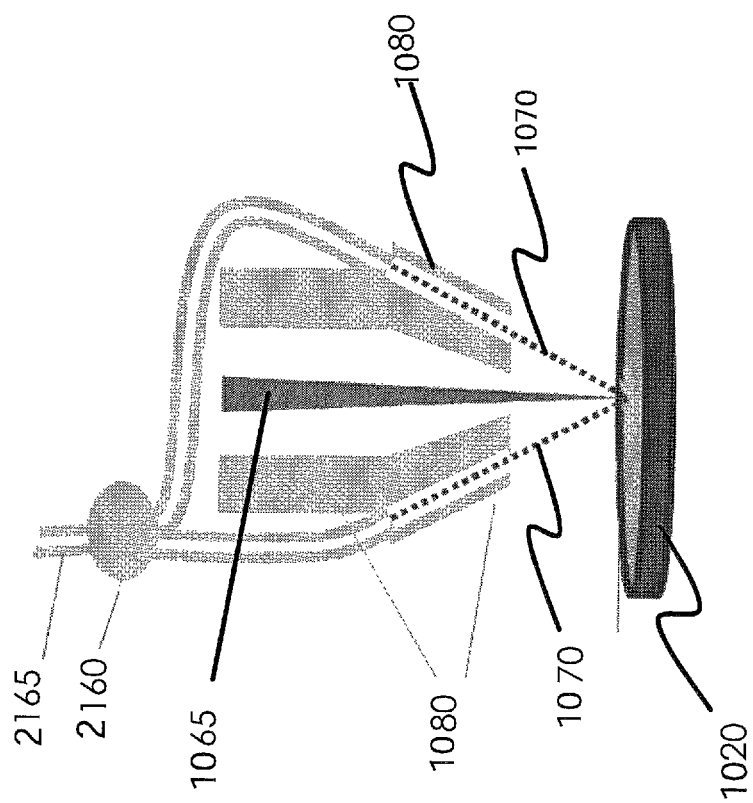
FIG. 13 shows a detail of the manufacturing device according to the invention as per FIGS. 11 and 12 for 3D printing of the component according to the method as per FIG. 10, schematically in a longitudinal section.

The CCD camera 2150 and the evaluation device 2155 are housed in integrally manageable fashion in the processing head 1090, i.e., integrally manageable together with the processing head 1090, such that the processing head 1090 and its housing (not illustrated in FIGS. 11, 12 and 13) reliably protect the CCD camera 2150 and the evaluation device 2155 from the rough process conditions prevailing during laser metal deposition.

Additionally, a material flow, kept constant, of the powdery welding material 1070 through the nozzle 1080 can be captured. The material flow is kept constant since it has a long delay time that restricts the use of a faster process feedback. A powder sensor 2160 in a powder supply line 2165 in the processing head 1090 observes the current material flow of the welding material 1070 and captures the latter as a volume flow. Capturing the volume flow facilitates an adaptation of the manufacturing process on account of changes in the volume flow of the welding material 1070 by adjusting the process parameters 1060. The powder sensor 2160 used in the illustrated exemplary embodiment is an optical flow meter that ascertains the component of the area of the cross section of an output of a powder conveyor (not shown in detail in the drawing) that is taken up by the powdery welding material 1070. The powder conveyor is arranged in the processing head 1090 for feeding the nozzle 1080 with welding material 1070 such that the welding material 1070 reaches the nozzle 1080 in a manner known per se for laser metal deposition and can be deposited on the component 1020.

A quadratic function of the volume flow is proportional in this case to the component of the area of the cross section of the output of the powder conveyor taken up by the powdery welding material 1070. Here, the volume flow of the welding material 1070 is taken into account by the controller 1050 in order to truly realize the intended geometry of the component 1020 during laser metal deposition 1095.

In the shown exemplary embodiment, the controller 1050 is realized as a PC system. As an alternative or in addition thereto, the controller 1050 can be embodied as a CNC controller in further exemplary embodiments, which incidentally correspond to the illustrated exemplary embodiment. Additional external hardware and software control devices are dispensable in this further exemplary embodiment. Here, process sensors are linked directly to the CNC controller by means of a fast bus interface.

Depending on the physical variables captured above, i.e., the actual height 1096 of the layer, the temperature of the melt pool 2140 and/or the volume flow of the welding material 1070, the controller 1050 ascertains an adapted set of process parameters 1060 for laser metal deposition 1095. The process parameters are adapted in such a way that geometric deviations of the component 1020 manufactured by means of laser metal deposition 1095 are minimized such that possible deviations occur below a set tolerance threshold. Accordingly, the component 1020 is manufactured in reliable and robust fashion.

The supply material is a powder or wire according to embodiments that can be combined with other embodiments described here. In particular, the method can be a method for laser metal deposition (LMD).

According to the present disclosure, laser-based additive manufacturing (on powder or wire basis) is provided in combination with a sensor system on the basis of interferometry (static or dynamic deflection) for process monitoring and/or process guidance on the basis of the measurement of geometric distances and topographies in or around the interaction zone between processing laser and workpiece.

By way of example, the optical measurement beam can be radiated-in in static fashion or move in precise and highly dynamic fashion through a laser metal deposition head, either through the powder flow (powder deposition welding) or past the wire, such that sequential or parallel measurement tasks can be carried out. A measurement task can be a topography measurement in the leading region (z-position of the workpiece surface) as a reference measurement or for process guidance. A further measurement task can be a topography measurement in the trailing region for determining the geometry of the deposited welding bead, for example for fault detection. The measurement results can be used for closed-loop control of process input variables (e.g., laser power, powder flow, wire advance, process speed).

The invention claimed is:

1. An apparatus for additive manufacturing, the apparatus comprising:
   a laser apparatus configured for material processing by a laser beam, wherein the laser apparatus is configured to steer the laser beam onto a processing region of a workpiece;
   at least one supply apparatus for a supply material, the at least one supply apparatus being configured to supply the supply material to the processing region; and
   an interferometer unit comprising an interferometer, the interferometer being configured to measure a distance to a surface of the workpiece using at least one optical measurement beam,
   wherein the interferometer is configured to move the at least one optical measurement beam in linear and rotary movements with respect to the laser beam.

2. The apparatus of claim 1, wherein the interferometer unit is configured to determine, using the distance measurement, at least one first physical variable, the at least one determined first physical variable comprising a size of a produced welding bead, a height of the produced welding bead, a position of the produced welding bead, a position of the surface of the workpiece, a topography of the surface of the workpiece, or any combination thereof.

3. The apparatus of claim 2, further comprising capturing means for capturing at least one second physical variable, wherein the at least one captured second physical variable comprises supply flow of the supply material, supply speed of the supply apparatus, laser power, focus diameter of the laser beam, dimension of a melt pool and a temperature of the melt pool, or any combination thereof.

4. The apparatus of claim 3, further comprising a controller configured to:
   control the laser apparatus based on the distance measured by the interferometer unit, based on the at least one determined first physical variable, based on the at least one captured second physical variable, or based on any combination thereof;
   control the at least one supply apparatus based on the distance measured by the interferometer unit, based on the at least one determined first physical variable, based on the at least one captured second physical variable, or based on any combination thereof; or
   control the laser apparatus and the at least one supply apparatus based on the distance measured by the interferometer unit, based on the at least one determined first physical variable, based on the at least one captured second physical variable, or based on any combination thereof.

5. The apparatus of claim 4, wherein the controller is further configured to control the laser apparatus, the at least one supply apparatus, or the laser apparatus and the at least one supply apparatus by closed-loop control of at least one process input variable, and
   wherein the at least one process input variable comprises a movement direction of the apparatus with respect to the workpiece, a movement speed with respect to the workpiece, a supply speed of the at least one supply apparatus, a supply flow of the supply material, a powder flow speed, a powder amount, a powder composition, a powder supply direction, a wire supply direction, a wire advance speed, an operating distance, a process gas composition, a process gas pressure, a laser focus diameter, a position of an optical axis, a laser focus position, a laser pulse width, the laser power, or any combination thereof.

6. The apparatus of claim 4, wherein the controller is further configured to adjust at least one process input variable such that deviations from a model of the processing region, a welding bead, or an additive manufacturing process are kept below an upper threshold, are minimized, or are kept below the upper threshold and are minimized.

7. The apparatus of claim 1, wherein the interferometer unit is further configured to measure a distance to the processing region, a distance to a region of the workpiece that lies adjacent to the processing region, or the distance to the processing region and the distance to the region of the workpiece that lies adjacent to the processing region.

8. The apparatus of claim 1, wherein the interferometer is a coherence interferometer or a low coherence interferometer, the interferometer is configured to couple the at least one optical measurement beam into a beam path of the laser apparatus, or a combination thereof, or wherein the interferometer comprises a beam path for the at least one optical measurement beam that is separated from the beam path of the laser apparatus.

9. The apparatus of claim 1,
wherein the interferometer is configured to provide the at least one optical measurement beam in movable fashion with respect to the laser beam,
wherein the interferometer is configured to move the at least one optical measurement beam back and forth in linear fashion or on a circular trajectory between a position in a leading region and a position in a trailing region, or
any combination thereof.

10. The apparatus of claim 1, wherein at least one central wavelength of a wavelength range of the at least one optical measurement beam lies at approximately 1550 nm, 1310 nm, 1080 nm, 1030 nm, 830 nm, or any combination thereof.

11. The apparatus of claim 1, wherein the at least one supply apparatus is configured to supply a powder or a wire as the supply material, the at least one supply apparatus comprises an annular jet powder nozzle, a multi jet powder nozzle, or an off-axis powder nozzle, or a combination thereof.

12. The apparatus of claim 1, wherein the apparatus is a laser metal deposition head.

* * * * *